United States Patent [19]
Patterson

[11] 3,726,319
[45] Apr. 10, 1973

[54] COMPRESSION SEAL PLUG

[75] Inventor: Billy R. Patterson, Diana, Tex.

[73] Assignee: Lone Star Steel Company, Dallas, Tex.

[22] Filed: Jan. 18, 1971

[21] Appl. No.: 107,337

[52] U.S. Cl. .................. 138/90, 73/49.8, 138/93
[51] Int. Cl. ...................... F16l 55/12, G01m 3/28
[58] Field of Search .................. 73/40.5, 49.1, 49.8; 138/90–93

[56] References Cited

UNITED STATES PATENTS

| 3,431,946 | 3/1969 | Sawyer | 138/93 |
| 2,610,651 | 9/1952 | Hahn | 138/90 |
| 2,130,030 | 9/1938 | Richardson | 138/93 |
| 2,767,795 | 10/1956 | Bush | 73/40.5 |
| 3,561,490 | 2/1971 | Little | 73/49.1 |

Primary Examiner—Louis R. Prince
Attorney—Paul J. Luckern

[57] ABSTRACT

The invention relates to a compression seal valve plug for easy sealing of a pipe section during pressure testing of the pipe section. The plug contains a flexible, elastic sleeve surrounding its central body section. In testing, test fluid causes expansion of the sleeve and creates a frictional holding force between the sleeve and the inside wall of the pipe section. This frictional holding force, in turn, is transmitted indirectly to the body section of the plug. The test fluid within the pipe section is isolated from the outside diameter of the sleeve by a seal in continuous contact with the inside wall of the pipe section. The pressure of the test fluid against the inside wall of the pipe section is easily determinable using pressure gauges outside the pipe.

3 Claims, 5 Drawing Figures

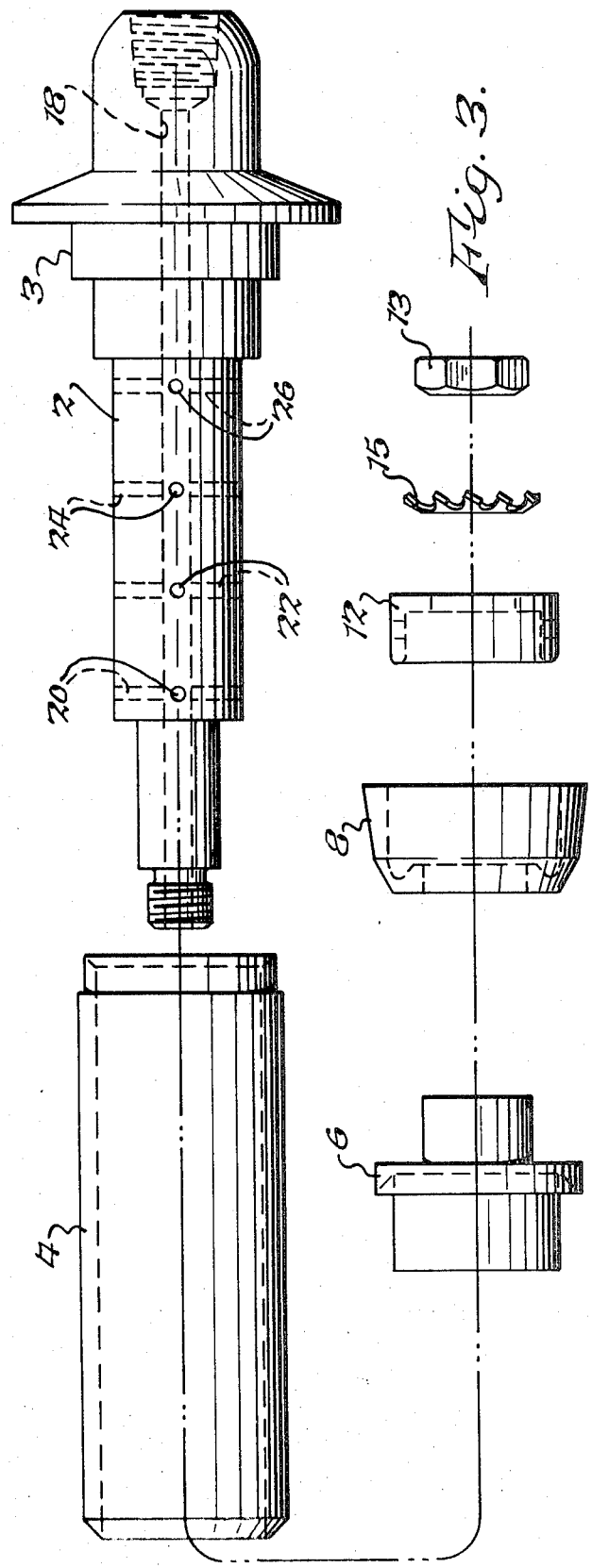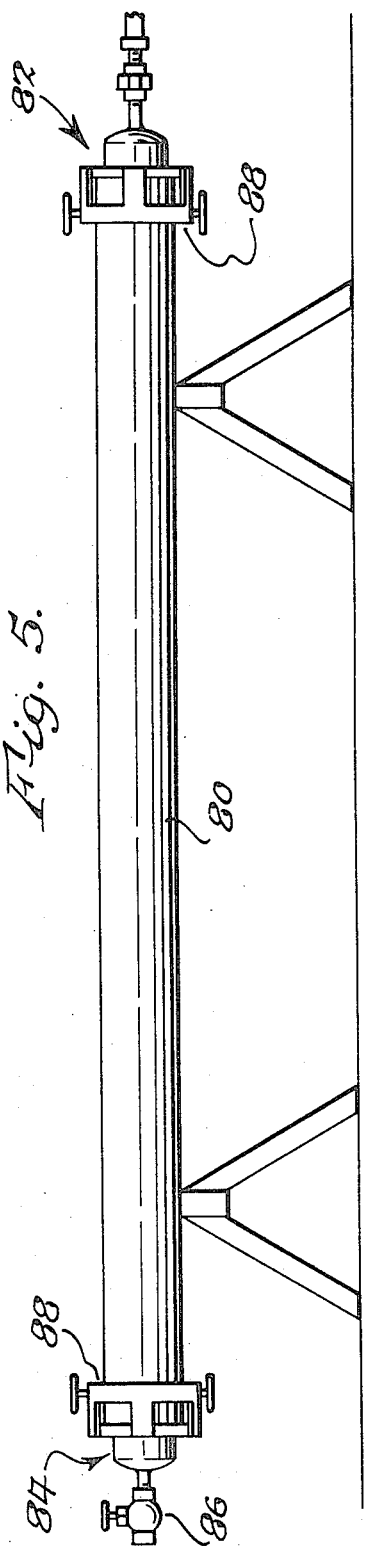

COMPRESSION SEAL PLUG

BACKGROUND OF THE INVENTION

All pressure piping in the United States is manufactured under one or more specifications that normally require pressure testing in the mill and, sometimes, after installation. The American Water Works Association (AMWA), American Society for Testing Materials (ASTM), and American Petroleum Institute (API) are some of the organizations that have published such specifications. In addition to these specifications the United States of American Standards Institute (USAS) has issued tentative standards that specify required test pressures. These are B31.8 covering Gas Transmission and Distribution Piping, and B31.4 for Liquid Petroleum Transportation Piping Systems. It is anticipated that new government regulations now being prepared will require re-testing of existing pipelines. My compression seal test plug will greatly facilitate such re-testing.

Pressure test plugs are known. In one prior art plug, a metal-to-metal gripping surface is provided by flexible longitudinal steel ribs on the plug which are joined to the end cap of the plug by a fusion weld and which are embedded in a full-length longitudinal elastic lining which terminates at the other end as a flared seal cup. When the plug is positioned in a pipe, the flared seal cup of the elastic lining comes into full-circumferential contact with the pipe wall to establish an initial pressure seal. For testing, pressure which is introduced into the pipe expands the elastic lining and forces the steel ribs against the inside diameter of the pipe. The holding force is a result of friction and is transmitted to the plug by tension in the ribs. Pressure on the pipe is readily determined by an outside gauge. With release of pressure after testing, the steel ribs of the plug relax as the elastic lining returns to its original shape. Release of pressure allows removal of the plug from the pipe. This prior art plug has a serious disadvantage in that when the elastic lining or flared seal cup wears out or suddenly springs a leak in testing, the friction between the inside diameter of the pipe and steel ribs is broken. This causes the plug to be blown from the pipe and bursts the steel ribs, the plug splitting when it bursts.

As examples of other prior art, an early U.S. Pat. No. 576,945 to Brenneman discloses a pipe attachment for plugging sewer and other pipes. Fluid under pressure is applied to a hollow metallic core to cause expansion of a flexible bulb surrounding the core. This expansion forces the flexible bulb against the inside diameter of the pipe. The Brenneman valve is cumbersome, however, and cannot be efficiently positioned and retained in place in the pipe.

U.S. Pat. No. 2,970,651 to Roberts discloses a hydraulically inflatable anchor for use in petroleum wells that prevents a packer from moving up or down within the oil well bore. The Roberts anchor contains a tubular support having an exterior recessed section with at least one port extending through this section. A longitudinal expandable sleeve, carrying longitudinal flexible bands, surrounds the recessed section. Expansion of the sleeve by a hydraulic fluid is said to anchor the Roberts device in the well bore. The Roberts device, like the Brenneman attachment, cannot be efficiently positioned and retained in place when used.

A pipe plug, shown in Richardson U.S. Pat. No. 2,130,030, has an expandable sleeve actuated by an outside pressure source. End fittings are employed on the plug. Those fittings are cumbersome, heavy and difficult to manipulate.

SUMMARY OF THE INVENTION

It is the object of my invention to provide a simple, efficient compression seal plug for pressure testing pipes and pipe sections.

It is yet another object of my invention to provide a pipe plug for pressure testing pipe sections and pipe assemblies at pressures up to 10,000 psi.

A further object of my invention is to provide a pipe plug which can be used repeatedly for an indefinite time.

Another object of my invention is to provide a pipe plug without the disadvantages of prior art devices.

These and other objects of my invention will become more apparent from a further reading of the description and claims when taken in conjunction with the following illustrations of which:

FIG. 3 is a side elevational view of the FIG. 2 embodiment in disassembly;

FIG. 5 is a view depicting pressure testing with FIG. 4 compression seal test plugs.

Broadly speaking in testing, my compression seal plug is pushed into a pipe section sealed at the other end by a second compression seal test plug, or by conventional means. Test fluid, which may be a liquid, e.g., solvent, emulsion, suspension, or a gas, is forced under pressure into the pipe section via the body section of the plug. The fluid causes a flexible, circumferential sleeve or gland of the plug, in contact with the body section of the plug, to expand radially against the inside wall of the pipe section creating a frictional holding force between the outside diameter of the flexible sleeve and the inside wall of the pipe section. This frictional force, which tends to hold the plug in place, in turn is transmitted by compression, as by column loading, via a retainer means, to the body section of the plug. This is in contrast to a transfer of the frictional force by tension. A flexible, retainer seal of the plug in full-circumferential contact with the inside diameter of the pipe section isolates the outside diameter of the flexible sleeve from the test fluid under pressure in the pipe section. This pressure created by the test fluid within the pipe section can be easily determined. Release of the test fluid automatically releases the pressure on the pipe wall, deflates the flexible sleeve and allows for the ready removal of the plug from the pipe section.

DETAILED DESCRIPTION OF THE INVENTION

Figure 1:
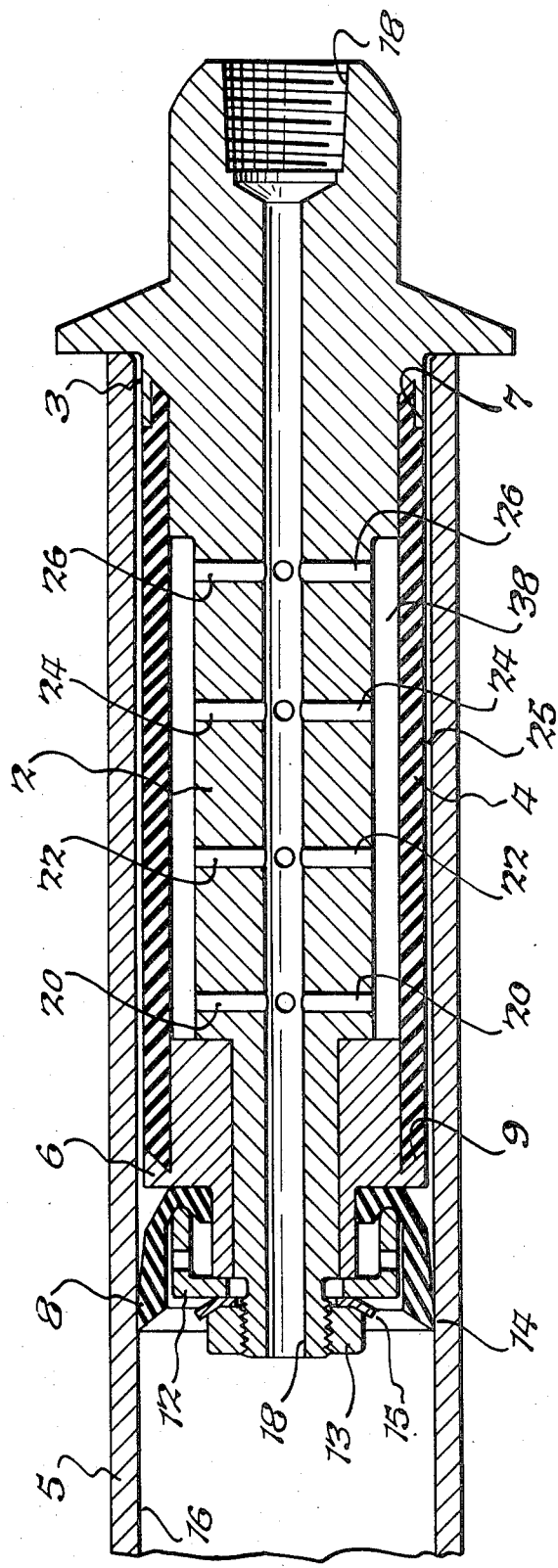
FIG. 1 is a vertical sectional view of a typical embodiment of my plug when in a pipe section.

Referring specifically to FIG. 1, my compression seal plug 1 comprises a body section 2 which extends longitudinally into pipe section 5 and which is in loose contact, at 3, with the inside diameter 16 of the pipe section 5. A flexible, ribless, expandable, circumferential, elastic sleeve 4 surrounds a central portion of said body section 2. One end of said sleeve 4 is in direct contact with a retainer 6 while the other end of said sleeve is in direct contact with body section 2. The retainer 6 positions and holds said elastic sleeve 4 in place in pipe section 5 and, in testing, transmits the holding force, caused by the friction between the inside wall diameter 16 of the pipe section 5 and the outside diameter of the expanded elastic sleeve 4, to the body section 2 via retainers 6, 12 and 13. A circumferential, flexible seal 8 is in continuous contact with the inside diameter 16 of the pipe section 5. In testing, seal 8 serves to isolate the outside diameter of the elastic sleeve 4 from the test fluid in pipe section 5. Circumferential seal retainer 12 holds the flexible seal 8 in place. The retainer 13, which may be a lock nut, maintains the seal retainer 12 in place. If desired, as shown in FIG. 1, lock washer 15 separates retainer 13 from seal retainer 12. This washer 15 is not necessary, however.

It is significant that my plug, in testing, is held in place by a compression force and not a tension force. Thus, when the ribless, flexible sleeve 8 expands against the inside diameter 16 of the pipe section 5 by addition of test fluid to the pipe section 5 via body section 2, a frictional force is set up between the inside pipe wall 16 and the ribless, flexible sleeve 4. Said frictional force, in turn, is indirectly transmitted to the body section 2 of the plug by compression as by column loading, via the retainers 6, 12 and 13. In testing, it is this frictional force which holds the plug in place and counteracts the force created by the test fluid that is within the pipe section 5 and is pushing against the flexible seal 8.

OPERATION

In testing, plug 1 is inserted into one end of a pipe section 5. The other end of pipe section 5 (not shown in FIG. 1) is sealed off using either a conventional seal or valve or a second compression seal plug. The outer edge 14 of circumferential, flexible seal 8 is in continuous contact with the inside diameter 16 of the pipe section 5. Fluid used for the testing is forced under pressure into the pipe section 5 via opening 18 of body section 2. The fluid, via openings or ports 20, 22, 24 and 26 in body section 2, flows into circumferential space 38 causing an expansion into space 25 of flexible, elastic sleeve 4 and against the inside diameter 16 of the pipe section 5 and creates a frictional force which tends to hold plug 1 in place. The circumferential, retainer 6 positions and holds the elastic sleeve 4 in place and helps to transmit said frictional force from the elastic sleeve 4 to the body section 2. The circumferential seal retainer 12 holds the flexible seal 8 in place while seal retainer 13 maintains retainer 12 in place and aids in transmitting the frictional force to body section 2. Pipe section 5 is then pressure tested by observing the pressure of the test fluid, e.g., water, on the walls of the pipe section beyond seal 8. Pressure of the fluid on the inside pipe walls can be conventionally determined by pressure gauges outside the pipe.

In my compression seal test plug, the body section 2, retainer 6, retainer 12 and retainer 13 may be made of brass, aluminum, low carbon steel or stainless steel. A.I.S.I. or S.A.E. 4140 or 1045 steel can be used. The specific material is not critical and is purely a matter of choice. Any tough material may be used. Sleeve 4 and seal 8 can be of any resilient material. Recommended materials are natural rubbers or any hard synthetic rubbers such as butadiene-acrylonitrile copolymer, neoprene or polyurethane hard rubber.

In one test the FIG. 1 embodiment was effectively used to test a 2⅜ inch (outside diameter) low carbon steel pipe of approximately 40-feet in length. The pipe is conventionally termed an "X—42 line pipe" in the art. A conventional valve was used to close the other end of the pipe. Water was used as the test fluid. In this test, it was found that the pipe could withstand at least a 3,100 psi gauge pressure.

OTHER EMBODIMENTS

Figure 2:
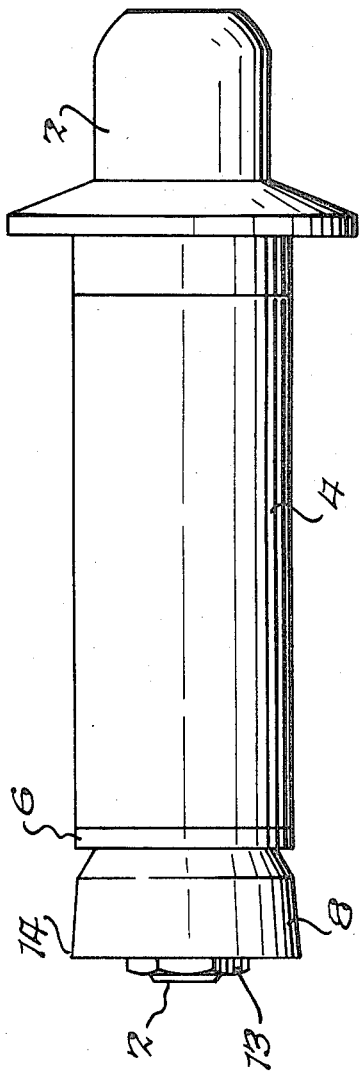
FIG. 2 is a side elevational view of the plug of FIG. 1.
Figure 4:
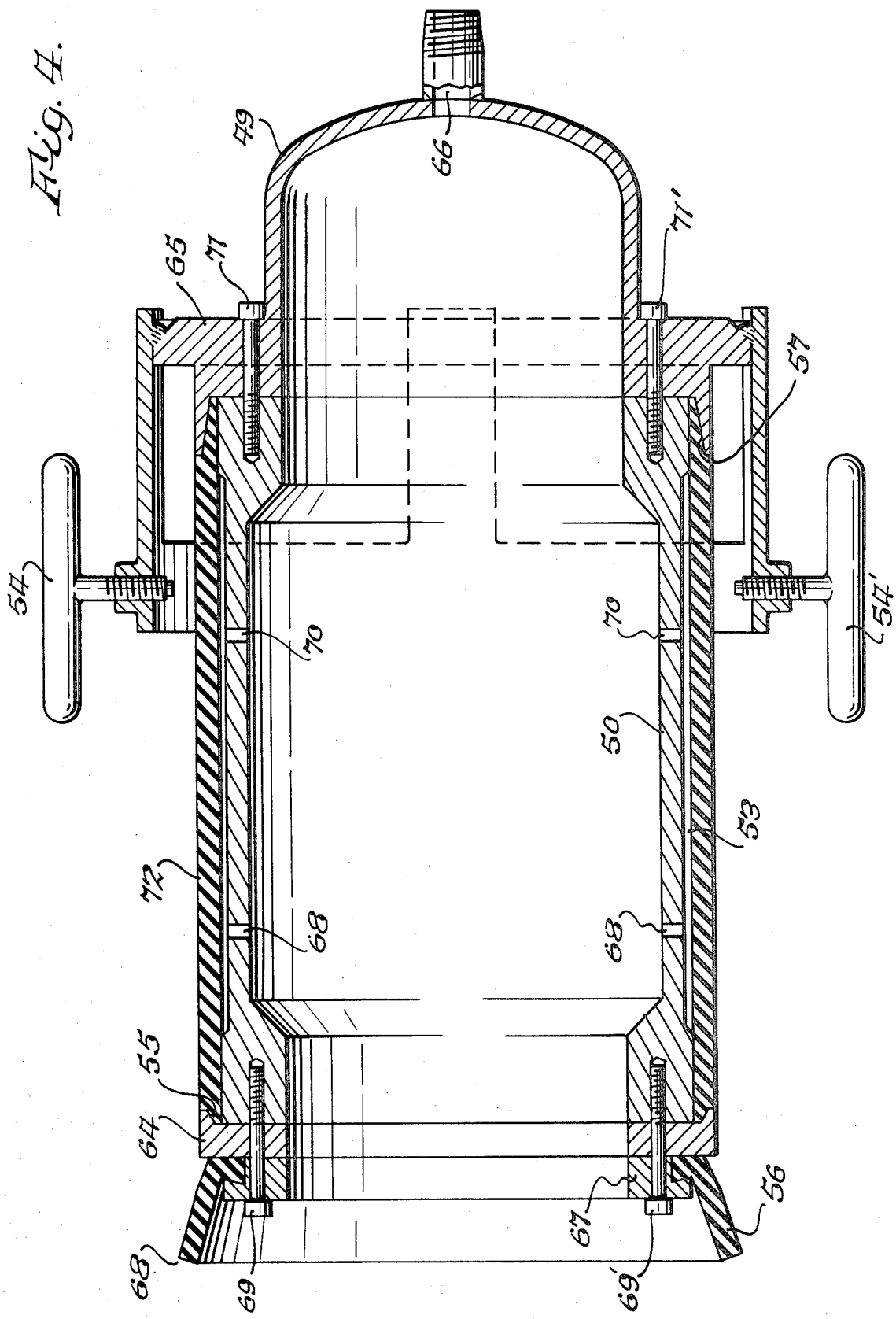
FIG. 4 is a vertical sectional view of a second embodiment of my plug.

While my invention has been described with reference to the specific embodiment shown in FIGS. 1, 2 and 3, this description should not be construed in a limiting sense. For example, in another embodiment of which FIG. 4 is a vertical sectional view, body section of plug 49 comprises side longitudinal, circular wall 50 and end wall or retainer cap 64 and end wall 65. End wall 65, which can be in sections, terminates in a narrow opening 66 which allows for the addition, under pressure, of test fluid into a pipe section (not shown in FIG. 4). Ribless, flexible expandable sleeve 72 surrounds wall 50. One end of said sleeve 72 is in direct contact with said wall 50 and with said wall or retainer cap 64; the other end of said sleeve 72 is in direct contact with said wall 50 and with said wall 65.

In testing, fluid under pressure enters at opening 66 and, through openings or ports 68 and 70 of wall 50, fills space 53 causing expansion of said sleeve 72 against the inside wall diameter of a pipe section (not shown in FIG. 4). The frictional holding force is transmitted to the retainer 64, to the retainer 67 and then to the body wall 50. In testing, seal 56 isolates test fluid in the pipe section from the outside diameter of sleeve 72. The outer extremity 68 of said seal 56 is in continuous contact with the inside wall diameter of the pipe section (not shown in FIG. 4). Retainer 67 via bolts 69 and 69' maintains the seal 56 and end wall or retainer cap 64 in place. Bolts 71 and 71' maintain end wall 65 in place. Clamps 54 and 54' secure the plug 49 in place in the initial setting. Thus an elastic sleeve will not expand without a few p.s.i. of pressure. Clamps 54 and 54' keep the plug positioned in the pipe until the "setting" pressure of sleeve 72 is reached. The "setting" pressure is that pressure at which the sleeve expands sufficiently to hold the plug in place. The setting pressure will vary from plug to plug, depending on the particular material used for the sleeve, the diameter of the sleeve and the sleeve's thickness. For small diameter pipes, e.g., 2⅜-inch outside diameter, clamps are generally not needed.

The embodiment shown in FIG. 4 is particularly advantageous when testing a large diameter pipe section, i.e., a pipe section above 4 inches in diameter. Use of the body section with walls 50, 64 and 65 keeps the weight of the plug 49, per se, down and hence this plug is much lighter, more economical to produce and handier to use than the FIG. 1 embodiment. Pipe sections of any size and shape can be pressure tested using my compression seal valve plug.

FIG. 5 shows a pipe section 80 being tested according to my invention. Compression seal plugs 82 and 84, as shown in the FIG. 4 embodiment, are at both ends of said pipe section 80. A conventional vent valve is at 86. Clamps are at 88.

In both embodiments, shown in FIGS. 1 and 4, the respective sleeves 4 and 72 are encased at both ends by overhanging lips (at 7 and 9 in FIG. 1 and at 55 and 57 in FIG. 4). As pressure is applied the sleeve ends are forced against these lips to form a seal. No adhesive is necessary for forming a seal.

Other variations and modifications of my plug will be apparent to those skilled in the art, and the claims appended hereto are intended to include all novel features which fall within the spirit of my invention.

What is claimed is:

1. A pipe pressure sealing plug for sealing an end of a pipe during pressure testing of said pipe comprising:
   1. a longitudinal body section having an elongated hollow opening for passage, under pressure, of a test fluid into said pipe and having at least one hollow opening perpendicular to the elongated opening;
   2. a flexible, expandable, elastic means surrounding a portion of said body section and adapted to receive pressurized test fluid from said body section through the hollow opening perpendicular to the elongated opening for expanding said elastic means from a position out of contact with the inside diameter of said pipe into a position in contact with said inside diameter to create a frictional holding force between the inside diameter of the pipe wall and said elastic means;
   3. retainer means for positioning and holding said elastic means in place and for transmitting the frictional holding force, when sealing said pipe, from said elastic means to said body section;
   4. a flexible sealing means which is in continuous circumferential contact with said inside diameter of said pipe to isolate the outside diameter of said elastic means from said pressurized test fluid passed into the pipe whereby said elastic means is free to expand and create said frictional holding force; and
   5. retainer means for holding said flexible sealing means in place.

2. The sealing plug according to claim 1 containing means for encasing both ends of the flexible, expandable elastic means.

3. The sealing plug according to claim 1 wherein the flexible, expandable elastic means is a resilient material.

* * * * *